United States Patent [19]

Morris

[11] Patent Number: 4,957,671
[45] Date of Patent: Sep. 18, 1990

[54] MANUFACTURE OF PLASTIC PRODUCTS
[75] Inventor: Harold B. Morris, Newnan, Ga.
[73] Assignee: M. A. Industries, Inc., Peachtree City, Ga.
[21] Appl. No.: 743,410
[22] Filed: Jun. 11, 1985
[51] Int. Cl.[5] .................... B29C 43/52; B29C 43/58
[52] U.S. Cl. .................................... 264/40.6; 264/41; 264/126; 264/297.6; 264/297.7; 425/407
[58] Field of Search .................. 264/331.11, 40.6, 1.3, 264/1.9, 2.2, 297.6, 297.7, 272.18, 41, 337, 299, 126, 320, 325, 237; 425/256, 407, 411, DIG. 201, 62, DIG. 54, DIG. 108, DIG. 246, 71, 144, 150

[56] References Cited
U.S. PATENT DOCUMENTS

| 3,542,702 | 11/1970 | Okada et al. | 264/DIG. 16 X |
| 3,576,929 | 4/1971 | Turner et al. | 425/71 X |
| 3,642,970 | 2/1972 | Hagitani et al. | 264/126 X |
| 4,332,847 | 6/1982 | Rowland | 264/293 X |
| 4,344,142 | 8/1982 | Diehr, II et al. | 425/144 X |
| 4,434,116 | 2/1984 | Covitch | 264/299 X |
| 4,490,321 | 12/1984 | Klinkaii | 425/407 X |
| 4,551,807 | 11/1985 | Hsich et al. | 264/40.6 X |

FOREIGN PATENT DOCUMENTS

| 559877 | 7/1958 | Canada | 264/331.11 |
| 3001172 | 7/1981 | Fed. Rep. of Germany | 264/331.11 |

Primary Examiner—Jeffery Thurlow
Assistant Examiner—Leo B. Tentoni
Attorney, Agent, or Firm—Patrick F. Henry, Sr.; Frederick L. Bergert

[57] ABSTRACT

A method for manufacturing plastic products from moldable plastic materials, involving the efficient use of a press and a mold is disclosed. The method includes heating the press and the mold to a temperature above the melt temperature of the plastic material, with the mold then being removed from contact with the press and with the press being applied to a replicate mold. The press is utilized so as not to apply pressure to the plastic material and the mold is preferably formed of a light weight material having high heat conductivity.

8 Claims, 2 Drawing Sheets

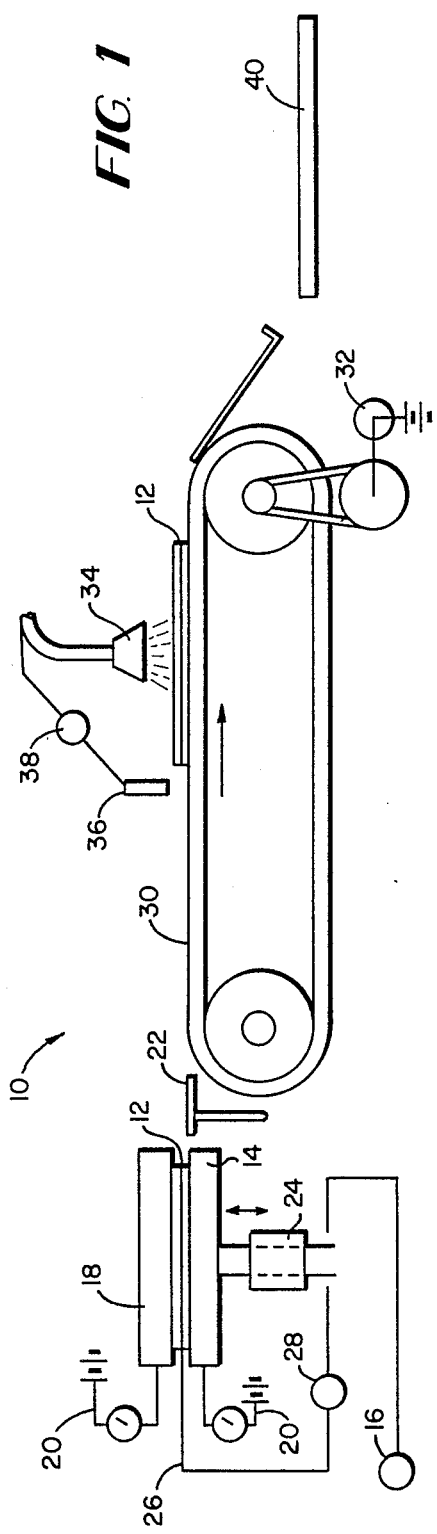
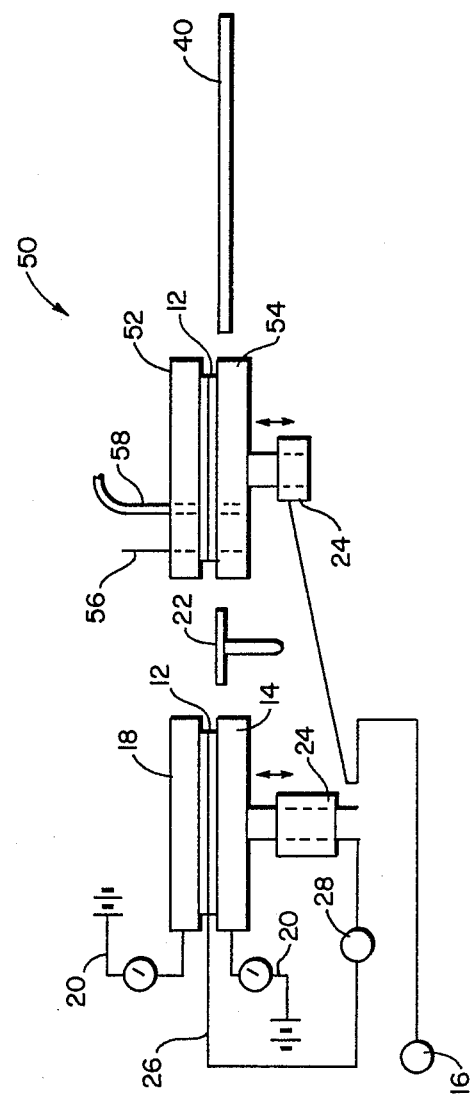
FIG. 1
FIG. 2

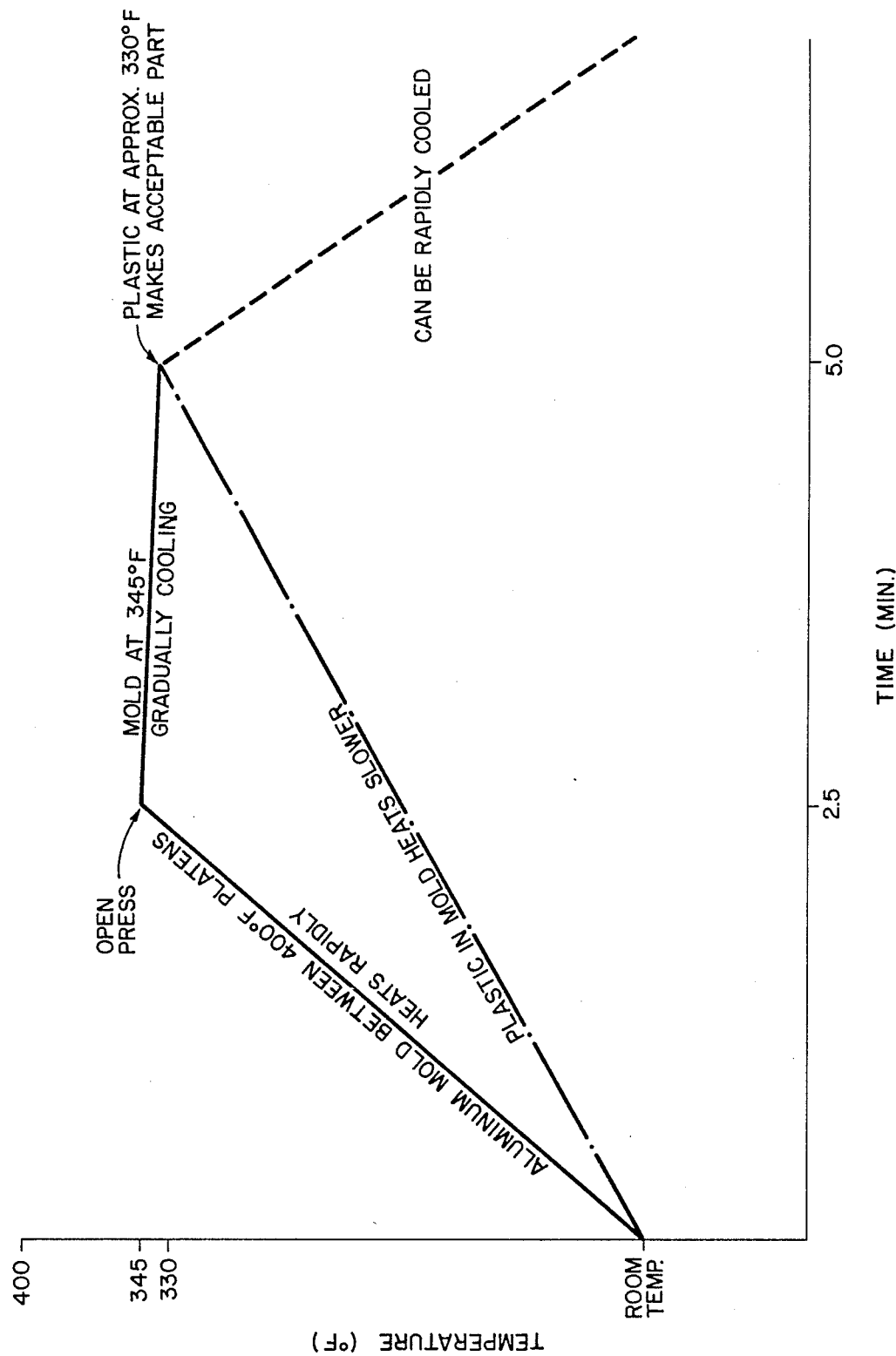

MANUFACTURE OF PLASTIC PRODUCTS

BACKGROUND AND SUMMARY OF THE INVENTION

The present invention relates to a novel method for manufacturing plastic products involving efficient use of heating and cooling. The invention relates to the preparation of plastic articles by methods which are much less energy intensive and more economical than those practiced in the prior art. The present invention is particularly successful in the manufacture of porous plastics but may also be adapted to molding processes wherein pressure on a softened, mobile plastic product is not required for part configuration or compaction. The present method is extremely attractive since it offers economy heretofore unavailable in existing practice.

Previous methods for casting and molding of thermoplastic or thermosetting materials have become very sophisticated, as evidenced by the following:

A. In compression molding, external heat is applied continually until the contained material melts and flows to cavity shape — and if thermosetting, until cross-linking results.

B. In transfer and inJection molding, the materials are preheated to softening temperature, then impressed into a cool (if thermoplastic) or hot (if thermoset) mold.

C. In liquid or reaction inJection, heating or cooling is utilized depending upon the reaction (either exothermic or endothermic).

In the above described prior art processes, molds are complex and bulky, requiring internal channels to enable self contained heating and cooling. Thus, the common means for molding is very energy intensive because of the massive heat and cooling demands of the complex mold. The present process, using very light weight molds of highly heat conductive materials such as aluminum, makes it possible to heat and cool quickly. In the present process, the press platens stay hot at all times. The present invention also simplifies the equipment and its cost since heated presses are commercially produced in quantity and heat conductive molds are easily machined and replicated. No internal channels are needed.

Previous methods in the art of compression molding are described in the following U.S. Pat. Nos.: 2,373,201 to Smith; 2,521,282 to Butler; 2,532,501 to Johnson; and 2,812,549 to Wall. Each of these patents stipulates the use of heat and pressure during manufacture of plastic materials. The Smith patent describes a system in which heating and cooling of a platen is intrinsic and automatic.

In the present invention, pressure is not applied to the plastic during manufacture. The platens close for metal to metal contact only for efficient, rapid heating. Also, in the present invention, cooling does not take place in the same press, thus avoiding chilling of the rapid heating source. In the Johnson patent, heating is carried out electrically but cooling is accomplished with circulating water, again cooling the heat source as well as the molded part. Each of the four patents discloses the use of either piped heat or cold, requiring voluminous structures to permit drilling for the channels. It has also been found that channeling seldom yields uniform heat exchange due to poor conduction and geometry of the steel platen or molds.

The heating method of the present invention is deemed novel since the contact temperature is so high as to be undesirable, especially when the plastic product must not be melted. In a self-contained mold, such temperatures would ruin the product. Then the quick removal of the high heat source at a controlled lower temperature allows the lagging plastic temperature to reach the required thermal state.

The present method is quite different and is particularly useful in manufacturing products having critical surface and structural requirements. The method involves the use of a two-stage temperature control system, a platen press, and sophisticated timing devices. The preferred embodiments of the method are described below

BRIEF DESCRIPTION OF THE DRAWINGS

FIG. 1 is a schematic representation of one embodiment of the present invention.

FIG. 2 is a schematic representation of an alternative embodiment of the present invention.

FIG. 3 is a graph showing certain parameters of one embodiment of the present invention.

DESCRIPTION OF THE PREFERRED EMBODIMENTS

In one embodiment in accordance with the present invention, a moldable thermoplastic material is placed within a containing vessel or mold. The container is then heated in a press at a set temperature exceeding the plastic melt temperature. The excess heat serves to rapidly raise the mold temperature to a second set temperature — thermocouple controlled, which is higher than the melt temperature of the thermoplastic but lower than the press temperature. Table 1 below shows the ranges possible and the preferred differences, with temperatures being shown in degrees F.

TABLE I

| PLASTIC MELT TEMP. | PRESS TEMP. | MOLD TEMP. |
| --- | --- | --- |
| 330 | 360–400 | 340–380 |
| Preferred 330 | 370–390 | 340–360 |

Since the mold heats much faster than the plastic, it is necessary to remove the high temperature source before fusion deteriorates the plastic surface and/or physical properties. The slower heating plastic is then allowed to heat at the mold temperature until the temperature producing the desired properties is achieved.

In one embodiment of the invention, as shown in FIG. 1, the apparatus 10 includes a mold 12 filled with plastic powder and placed on bottom platen 14. Valve 16, a platen closing valve, is activated to raise the platen 14 to contact mold 12 and top platen 18. Both platens are heated to about 400 degrees F.

The apparatus 10 further includes platen thermocouples 20 and level guide plates 22. Air cylinders 24 are provided for raising and lowering the bottom platen 14.

A thermocouple 26 inserted in the mold 12 activates the opening control 28 for the platens 14, 18 when the mold temperature reaches about 345 degrees F. The mold 12 is then pushed by a second replicate mold, not shown, onto endless belt 30 driven by drive means 32 and moving at a slow speed predetermined to allow activation of a water fogger 34 after about one minute of "tempering" while the plastic continues to approach the decreasing mold temperature. A mold sensor 36 activates water valve 38 to operate the fogger 34.

At this time, the advantages and novelty of the invention become apparent. Under the stated conditions, the filled mold 12 reaches the desired temperature in 2 to 2½ minutes. Then the heat source, at 400 degrees F. and never cooled, is applied to a replicate mold, providing a 2½ minute cycle per mold. Part removal tables 40 are provided for removal of the molds. Previous methods known in the art generate much longer cycles due to:

A. The large mold mass, necessitated by the need for drilled or cast interior channels, increases the heating time and also lengthens the cooling time.

B. The danger of melting the plastic powder requires the heating to be done at a lower temperature, about 330 degrees to 340 degrees F.

In view of these conditions, the prior art methods would utilize 5 to 7 minute cycles, contrasted with a cycle of 2 to 3 minutes according to the invention. Such an improvement saves energy and enhances economics.

After the fogging nozzle 34 is deactivated by passage of the mold 12 and excess water blown off by an air curtain, the mold 12 is opened, and molded parts removed. The mold 12 is then filled again and made ready for replacing the exiting mold at press opening.

In the embodiment as shown in FIG. 2, a second press 50 with cooling water channels is an alternative to conveyor and fogging. The press 50 includes cooling platens 52, 54 with circulating water means operated in conJunction with platen thermocouple 56 and cooling water valve 58. In this embodiment, both presses open simultaneously by a timer setting which is predetermined by measuring the interval for the molds to reach about 345 degrees F. A first hot mold is pushed out of the hot press into the cooling press by a second, filled mold and the presses are closed. The process is repeated at a cooling temperature adjusted to fit the 2½ minute heating cycle and to facilitate comfortable handling by the operator. The cool molds are removed and recycled as described for the first embodiment.

The graph provided in FIG. 3 shows the relationship of temperature to time when proceeding in accordance with the present invention.

It should be understood that the temperatures and times may vary due to the following: changes in ambient climate; rheological differences in raw materials; contours and size of molded parts; and normal thermodynamic corrections necessary to a continuous process. These parameters are well understood by those skilled in the art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for manufacturing a porous plastic product which comprises:
    (a) placing a mold constructed of a light weight highly heat conductive material and containing a moldable plastic material capable f forming a porous product within a press having a pair of platens, said platens being at a temperature above the melt temperature of the plastic material;
    (b) closing the press for contact of said platens without applying pressure to said plastic material;
    (c) heating the mold to a temperature which is above the melt temperature of the plastic material but below the temperature of said platens;
    (d) controlling the temperature of the mold to open the press platens at the proper time such that the mold will have reached a predetermined temperature which will allow the plastic material to continue heating to a temperature which produces the desired porous properties;
    (e) opening said press platens and removing the mold from said press prior to said plastic material having reached its melt temperature and at such time as said mold has reached said predetermined temperature;
    (f) allowing said plastic material to continue heating to said temperature which produces the desired porous properties; and
    (g) cooling the mold and plastic material to provide a porous plastic product, whereby a 2 to 3 minute cycle per mold is obtained.

2. The method of claim 1 wherein the mold is formed of a light weight material having high heat conductivity.

3. The method of claim 2 wherein the mold is formed of aluminum.

4. The method of claim 1 wherein the temperature of the mold is thermocouple controlled.

5. The method of claim 1 wherein, after removal of the mold, the heated press is applied to a replicate mold, the press platens remaining at said temperature above the melt temperature of the plastic material.

6. The method of claim 5 wherein the mold is pushed onto conveyor means by said replicate mold.

7. The method of claim 5 wherein the mold and plastic material are cooled by use of a cooling press, with the mold being pushed out of said heated press into said cooling press by said replicate mold.

8. The method of claim 7 wherein said heated press and said cooling press are set to open simultaneously.

* * * * *